Figure 1:
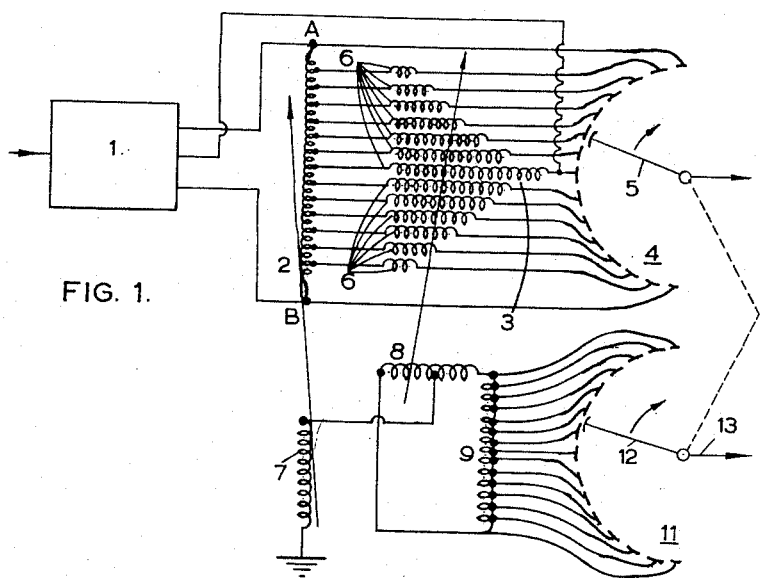

Nov. 21, 1961  R. E. SPENCER  3,009,642
APPARATUS FOR DERIVING A DIFFERENTIAL COEFFICIENT
Filed Dec. 11, 1956

Inventor
R. E. Spencer

United States Patent Office 3,009,642
Patented Nov. 21, 1961

3,009,642
APPARATUS FOR DERIVING A DIFFERENTIAL COEFFICIENT
Rolf Edmund Spencer, London, England, assignor to Electric & Musical Industries Limited, Hayes, Middlesex, England, a company of Great Britain
Filed Dec. 11, 1956, Ser. No. 627,614
Claims priority, application Great Britain Dec. 15, 1955
4 Claims. (Cl. 235—197)

This invention relates to apparatus for deriving the rate of change on one variable with respect to another.

In some automatic machine tools, especially automatic milling machines, it is desirable that the instructions to the machine shall comprise a representation of the actual shape to which the workpiece is to be cut. Thus, values of one or more co-ordinates of successive reference points along the required surface of the workpiece are recorded. This is only permissible however, where a cutting tool of finite dimensions is employed if the machine includes means for compensating for the dimensions of the cutting tool. Such compensating means is described in the specification of United States Patent No. 2,883,110 and it has the requirements that signals representing the rate of change of one co-ordinate with another co-ordinate at points along the required surface of the workpiece, are available. Such a rate of change will moreover hereafter be referred to as a differential co-efficient. In the apparatus described in the aforesaid United States patent specification provision is made for controlling the machine in three co-ordinate directions, and the instantaneous instructions for each direction are derived by quadratic interpolation within three signals alternating signals having amplitudes representing the respective co-ordinate of the surface at three points, termed reference points, these reference point signals being derived from a record such as a punched tape. The interpolation is performed by apparatus such as described in the specification of United States Patent No. 2,928,604 and by such apparatus it is possible to derive highly accurate instructions from a limited number of reference points. Obviously in such an arrangement any means for deriving differential coefficients with a view to compensating for the dimensions of the tool should be as accurate as the means for deriving the coordinates of points on the surface. It would be possible to record the differential coefficient required at numerous points on the surface of the workpiece as programmed information for the machine but this has obvious practical disadvantages in the prolonged programming time and additional instrumentation which would be required. Obviously it would be more economical and practical if a required differential coefficient could be derived from the same reference points as those used for interpolating a co-ordinate of the required surface.

The object of one aspect of the present invention is to derive the differential coefficient of a quadratic function at a desired point within an interval of said function in response to three alternating signals having amplitudes representing three values of the function.

The object of another aspect of the present invention is to provide electrical means whereby signals representing the differential coefficient of a function at a plurality of points may be derived from a knowledge of differential coefficients at one point.

According to the first aspect of the present invention there is provided apparatus for deriving the differential coefficient of a quadratic function at a desired point within an interval of said function and in response to three alternating signals having amplitudes representing the value of said function at three other points in said interval, comprising transformer primary windings having three degrees of freedom, input connections for applying said signals to said windings to constrain said degrees of freedom so as to induce a first flux variation proportional to the first differential coefficient of said function at one point in said interval, and a second flux variation proportional to the second differential coefficient of the function, and means including transformer secondary windings coupled respectively to said primary windings by said flux variations for combining alternating signals having amplitudes so proportioned to said flux variations as to produce a signal representing the differential coefficient of the function at the desired point.

According to the second aspect of the present invention there is provided apparatus for deriving differential coefficients of a quadratic function comprising transformer means for establishing across an impedance an alternating potential having an amplitude representing the second differential coefficient of said function and further transformer means for raising the potential of a point on said impedance to an alternating potential having an amplitude representing the first differential coefficient of said function at a point corresponding to said first mentioned point and means for selecting potentials at other points on said impedance whereby the amplitudes of the selected potentials represent the first derivatives at corresponding points of said function.

By varying the constant of proportionality for one of the combined signals relative to the other, it is readily possible to derive values of the derivative at a series of values of the variable in said interval.

Figure 2:
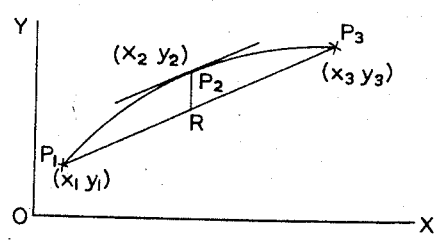
Figure 3:
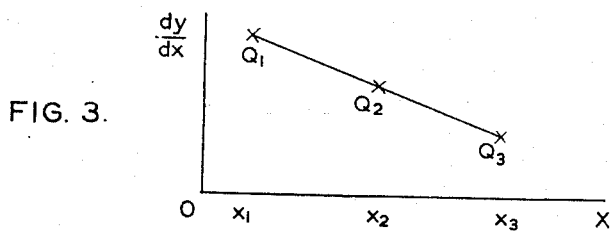

In order that the invention may be clearly understood and readily carried into effect, the invention will be described with reference to the accompanying drawings, in which:

FIGURE 1 illustrates one example of a differentiating device in accordance with the invention some component of the device being common to an interpolating device according to the above-mentioned co-pending patent application, and FIGURES 2 and 3 comprise graphs explanatory of the operation of the apparatus of FIGURE 1.

Referring to FIGURE 1, a switch device 1, of the type described in the above mentioned United States patent specification No. 2,928,604 receives signals from a record reader and sets up three co-phasal alternating carrier voltages amplitude modulated to be representative of three consecutive reference values $y_1$, $y_2$ and $y_3$ of a variable $y$ corresponding to three equally spaced values say $x_1$, $x_2$ and $x_3$, of $x$, a variable upon which $y$ depends. The voltages $y_1$ and $y_3$ are fed to A and B, the ends of a transformer primary winding 2 and the voltage $y_2$ is fed to the terminal D of transformer primary winding 3, remot from the mid-point C of the winding 2 to which the winding 3 is connected. Other tappings of the winding 2 are joined via transformer secondary windings 6 coupled to the primary winding 3 to the studs 4 on a half circle of a stud switch which are swept by a brush 5 from which is derived the interpolated output. As thus far described the apparatus is of the construction described in the aforesaid co-pending patent application.

The arrangement of transformer windings comprising the transformer primary winding 2 and the transformer primary winding 3 may be regarded as having three degrees of freedom. That is, the least number of electrical variables which must be determined before the electrical state of the arrangement is completely determined, is three. The degrees of freedom in the present arrangement are the magnetic flux linkage with 2, the potential at the mid-point of 2 and the magnetic flux linkage with 3. These degrees of freedom are constrained in the present invention by the application of cophasal reference signals to the points A, B and D but other methods of applying the necessary constraints are clearly possible.

Coupled to the transformer primary winding 2 is a transformer secondary winding 7 one end of which is earthed and the other end of which is connected to the mid-point of another transformer secondary winding 8 which is coupled to the winding 3. The two ends of the transformer winding 8 are joined to the ends of an auto-transformer 9 of a linear interpolator which may be of the type described in British patent specification No. 802,472. Tappings are taken at equal intervals along 9 and these are connected to studs 11 on a half circle of a stud switch. Each stud corresponds to one of the studs 4 and the brush 12 of this interpolator may be coupled in the correct sense with the brush 5 so that the output at 13 which is the signal representing the differential coefficient may correspond with the output at 5.

The operation of the apparatus of FIGURE 1 will be described with reference to FIGURES 2 and 3. FIGURE 2 comprises a graph showing the points $P_1$ $(x_1, y_1)$, $P_2$ $(x_2, y_2)$ and $P_3$ $(x_3, y_3)$ the curved line joining the three points representing the quadratic curve passing through the three points. The line $P_2R$ is parallel to axis $OY$; therefore R is the mid-point of the straight line $P_1, P_3$ since $x_2-x_1=x_3-x_2$ because the values of $x$ are equally spaced. Therefore the co-ordinates of R are $$\frac{x_1+x_3}{2}, \frac{y_1+y_3}{2} \text{ or } x_2, \frac{y_1+y_3}{2}$$

On the quadratic curve:

let
$$y=f(x)=ax^2+bx+0$$

Therefore, as described in United States patent specification No. 2,928,604 the voltages along the transformer winding 2, if the voltage at A is $y_1$ and the cophasal voltage at B is $y_3$, may be represented by the $y$ co-ordinates of points along the straight line $P_1RP_3$. This deduction follows from the fact that the coupling between adjacent turns of the transformer 2 maintains a linear voltage gradient along that winding. It also follows that the voltage at the mid-point C of the winding 2 is $$\frac{y_1+y_3}{2}$$

Now by Taylor's theorem:

$$y_1=f(x_1)=f(x_2)+(x_1-x_2)f'(x_2)+\frac{(x_1-x_2)^2}{2!}f''(x_2)$$

and $$y_3=f(x_3)=f(x_2)+(x_3-x_2)f'(x_2)+\frac{(x_3-x_2)^2}{2!}f''(x_2)$$

since $f$ is a quadratic function $f'''(x)$ and higher derivatives are zero $$\therefore y_3-y_1=(x_3-x_1)f'(x_2) \text{ (since } x_2-x_1=x_3-x_2\text{)}$$

Since $y_3-y_1$ is the voltage across the winding 2, between the terminals A and B, the voltage across AB and hence the flux linking with transformer winding 2 is proportional to the first derivative of $y$ with respect to $x$ at $P_2$. Because the transformer winding 7 is coupled with the winding 2, the voltage developed across it must also be proportional to $f'(x_2)$.

Since by definition $y=ax^2+bx+c$, it follows that the first and second derivates of $y$ are $$\frac{dy}{dx}=2ax+b$$

and $$\frac{d^2y}{dx^2}=2a$$

Also, as the $y$ co-ordinate of the point R is, as aforesaid, $$\frac{y_1+y_3}{2}$$

the length $$P_2R=y_2-\frac{y_1+y_3}{2}$$

and furthermore $y_2=ax_2^2+bx_2+c$

Bearing in mind that $$x_2=\frac{x_1+x_3}{2}$$

the above equation for $P_2R$ can be written as $$=a\frac{(x_1+x_3)^2}{4}+\left(b\frac{x_1+x_3}{2}\right)+c-a\frac{x_1^2+x_3^2}{2}-b\frac{x_1+x_3}{2}-c$$

$$=-a\left(\frac{x_1-x_3}{2}\right)^2$$

$$=-\frac{1}{8}(x_1-x_3)^2\frac{d^2y}{dx^2}, \text{ since } a=\frac{d^2y}{dx^2}$$

∴ the voltage across DC, that is the inductance 3, is proportional to $$\frac{d^2y}{dx^2}$$

(which is a constant). Hence the voltage developed across the inductance 8 is also proportional to $$\frac{d^2y}{dx^2}$$

FIGURE 3 represents a graph showing the relationship of $$\frac{dy}{dx}$$

to $x$. The voltage induced across the inductance 7 may be represented by the point $Q_2$, it being equal to $f'(x_2)$. Further, the voltage induced across the transformer 8 is proportional to the difference between the values of $$\frac{dy}{dx}$$

at $P_1$ and $P_3$.

By choosing of the relative values of the inductances 7 and 8 it is arranged that the output voltage of transformer winding 8 has the same factor of proportionality to $$\frac{d^2y}{dx^2}$$

as the output voltage of the transformer winding 7 has to $$\frac{dy}{dx}$$

Since therefore the terminals of the transformer winding 9 of the linear interpolator are connected to the terminals of the transformer winding 8, the output at 13 of the linear interpolator is represented by the line $Q_1$, $Q_2$, $Q_3$. The alternating voltages set up at the various contacts 11 therefore represent successive values of the differential co-efficient of the function defined by the alternating voltages applied to A, B and D, for corresponding values of the variable. In the arrangement shown in FIGURE 1 moreover, the brush 12 is mechanically coupled to the brush 5 which derives values of the function for successive values of the variable $x$ so that at any time the differential co-efficient represented by the voltage at 13 corresponds to the value of the function represented by the alternating voltage derived by 5 from the series of contacts 4.

The second derivative of $y$ with respect to $x$ may quite clearly be obtained from the inductance alone.

Linear interpolation between the alternating potentials across 8 is all that is necessary because the line $Q_1$, $Q_2$, $Q_3$ is straight and the linear interpolator therefore selects different fractions of the signal induced in 9 to correspond to different points on the quadratic curve defined by the alternating potentials applied to the input terminals A, B and D. The autotransformer 9 of the linear interpolator may be dispensed with if the inductance 8 is tapped and the output derived from a brush sweeping the tappings in correspondence with the brush 5.

If the three points $P_1$, $P_2$, $P_3$ are co-linear a control signal may be set up which is arranged to switch the lead from D, from the intermediate reference signal point to C so as to short circuit the inductance 3; the terminals of 8 are then at the same potential as the tapped point which is at the potential of the upper terminal of 7.

If moreover, further interpolation means are provided to reduce the size of increments between successive output signals representing required values of a co-ordinate provided by the brush 5 further interpolation means may also be provided if desired to give corresponding values of the differential coefficient for points represented by signals from the other additional interpolator.

Again, if it is required to provide as is usually the case in machine tool control, continuous interpolation over a plurality of successive reference points the present invention may be duplicated and each unit operated alternately thus allowing for the reference signals applied to the transformer primary windings to be changed. The brushes 5 and 12 of the present example of the invention may in this case be arranged to provide such operation by scanning the respective sets of studs alternately. The first and last studs of each semicircle must then be half studs as shown in FIGURE 1 of the drawing.

Although furthermore, the invention has been hitherto described with reference to a co-ordinate $x$, clearly any other parameter may be operated upon in a similar manner. For example the invention may be applied to an instrumental parameter such as time and may be especially useful when used in conjunction with a parametric interpolator such as described in co-pending United States application Serial Number 581,038.

One achievement of the present invention is to derive the differential coefficient of a quadratic function at a desired point within an interval of the function in response to three alternating signals having amplitudes representing three values of the function and although the invention has been described in an application to the one form of apparatus of co-pending United States application Ser. No. 459,814, it is to be appreciated that the invention may be applied to other forms of apparatus described therein and in fact may be modified for use with other interpolators or it may be constructed to comprise its own exclusive transformer primary windings.

A further achievement of the invention is that electrical means are provided whereby signals representing the differential coefficients of a quadratic function at a plurality of points may be derived from a knowledge of the first differential coefficient at one point and the second differential coefficient.

Although the invention is herein described with reference to apparatus in relation to machine tools it is clearly not limited thereto but may be advantageously employed in other applications requiring the provision of differential coefficients of a function.

What I claim is:

1. Apparatus for deriving the differential co-efficient of a quadratic function comprising a first transformer winding and a second transformer winding, each having two terminals, a terminal of said second transformer winding being directly connected to an intermediate connecting point on said first winding, means for establishing alternating voltages at the other three of said terminals representing the values on a co-ordinate at spaced points and means for deriving an alternating voltage proportional to the flux variations in said first transformer winding, means for deriving a second alternating voltage proportional to flux variations in said second transformer winding and means for adding said derived alternating voltages to derive a voltage representing the differential co-efficient at one point of a quadratic curve determined by the amplitudes of the alternating voltages applied to said three terminals.

2. Apparatus according to claim 1 comprising means for selecting different fractions of said second derived voltage to represent different displacements of said point along said curve.

3. Apparatus according to claim 2, comprising a third transformer winding inductively coupled to said first transformer winding and having two terminals, a fourth transformer winding inductively coupled to said second transformer winding and having two terminals, wherein one terminal of said third winding is connected to a point of reference voltage and the other terminal is connected for direct current to an intermediate point of said fourth winding, and said means for selecting different fractions comprising a linear interpolator connected from one terminal of said fourth transformer winding to the other.

4. Apparatus according to claim 3, said linear interpolator comprising an impedance having two terminals respectively connected to the terminals of said fourth transformer winding and comprising electrically spaced tappings and means for successively making contact with said tappings to select successive different ones of said fractions.

References Cited in the file of this patent
UNITED STATES PATENTS

| | | |
|---|---|---|
| 2,883,110 | Spencer et al. | Apr. 21, 1959 |

FOREIGN PATENTS

| | | |
|---|---|---|
| 389,524 | Great Britain | Mar. 20, 1933 |
| 757,543 | Germany | Aug. 17, 1953 |

OTHER REFERENCES

Electronic Engineering (Mynall), June 1947, p. 179.